(12) United States Patent
Saruwatari et al.

(10) Patent No.: US 12,296,933 B2
(45) Date of Patent: May 13, 2025

(54) OUTBOARD MOTOR

(71) Applicant: YAMAHA HATSUDOKI KABUSHIKI KAISHA, Iwata (JP)

(72) Inventors: Kimitaka Saruwatari, Shizuoka (JP); Akihiro Noma, Shizuoka (JP); Ryo Nakanishi, Shizuoka (JP); Isao Tateishi, Shizuoka (JP); Makoto Mizutani, Shizuoka (JP); Kenji Yukishima, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 544 days.

(21) Appl. No.: 17/699,495

(22) Filed: Mar. 21, 2022

(65) Prior Publication Data
US 2022/0306258 A1 Sep. 29, 2022

(30) Foreign Application Priority Data
Mar. 26, 2021 (JP) ................. 2021-053365

(51) Int. Cl.
B63H 20/14 (2006.01)
B63H 20/32 (2006.01)

(52) U.S. Cl.
CPC ....... B63H 20/14 (2013.01); B63H 2020/323 (2013.01)

(58) Field of Classification Search
CPC .. B63H 20/00; B63H 20/14; B63H 2020/323; B63H 23/00; B63H 23/30
USPC ...................................... 440/75, 83
See application file for complete search history.

(56) References Cited

U.S. PATENT DOCUMENTS 6,547,613 B1 * 4/2003 Onoue .................. B63H 23/34
440/75
9,840,314 B2 * 12/2017 Kuroki .................. B63H 20/14
2015/0336647 A1 11/2015 Ariga

FOREIGN PATENT DOCUMENTS

JP 2000-280983 A 10/2000
JP 2015-217893 A 12/2015

* cited by examiner

Primary Examiner — Lars A Olson
(74) Attorney, Agent, or Firm — Keating & Bennett, LLP

(57) ABSTRACT

An outboard motor includes a drive shaft, a coupling to connect a first shaft and a second shaft of the drive shaft together, and a transmission including a dog clutch to transmit a rotation of the drive shaft to a propeller shaft. The coupling includes a first portion attached to the first shaft, a second portion attached to the second shaft, and a damper. The first portion includes first claws arranged along a rotation direction of the drive shaft. The second portion includes second claws between adjacent ones of the first claws in the rotation direction. The damper includes an elastic portion interposed between adjacent ones of the first claws and the second claws in the rotation direction.

7 Claims, 12 Drawing Sheets

OUTBOARD MOTOR

CROSS REFERENCE TO RELATED APPLICATIONS

This application claims the benefit of priority to Japanese Patent Application No. 2021-053365 filed on Mar. 26, 2021. The entire contents of this application are hereby incorporated herein by reference.

BACKGROUND OF THE INVENTION

1. Field of the Invention

The present invention relates to an outboard motor.

2. Description of the Related Art

An outboard motor disclosed by Japanese Unexamined Patent Publication No. 2000-280983 includes an engine, a drive shaft that extends downwardly from a crankshaft of the engine, a propeller shaft that is connected to the drive shaft through a forward/backward movement switching mechanism, a propeller that is connected to a rear end portion of the propeller shaft, and a buffer that is disposed at the middle of the drive shaft. The forward/backward movement switching mechanism includes a bevel gear that is connected to a lower end of the drive shaft, a pair of front and rear bevel gears that always engage with the bevel gear, and a slider that slides on the propeller shaft and selectively engages and interlocks with the pair of front and rear bevel gears. When the slider does not engage and interlock with either of the pair of front and rear bevel gears, the shift position of the outboard motor is neutral. When the slider engages and interlocks with either of the pair of front and rear bevel gears, this state is referred to as "shift-in."

The drive shaft is divided into halves, i.e., into an upper driving-side part and a lower driven-side part by means of the buffer. The buffer includes a circular outer cylinder that is formed at a lower end portion of the driving-side part, a circular inner cylinder that is inserted into the outer cylinder and is connected to an upper end portion of the driven-side part, and a ring-shaped gum rubber fastened to a lower portion of an inner peripheral surface of the outer cylinder and to a lower portion of an outer peripheral surface of the inner cylinder by means of baking. A plurality of claws that protrude inwardly in a radial direction are disposed at equal intervals in a circumferential direction at the upper portion of the inner peripheral surface of the outer cylinder. A plurality of claws that protrude outwardly in the radial direction are disposed at equal intervals in the circumferential direction at the upper portion of the outer peripheral surface of the inner cylinder. The claw of the outer cylinder and the claw of the inner cylinder are alternately arranged with an interval therebetween in the circumferential direction.

When the engine is driven, the rotation of the crankshaft is transmitted to the drive shaft, and, as a result, the drive shaft rotates. When the shift position of the outboard motor is neutral, the claw of the outer cylinder and the claw of the inner cylinder are spaced away from each other, and, in the drive shaft, the rotation of the driving-side part is transmitted to the driven-side part through the gum rubber. When the slider engages and interlocks with either of the pair of front and rear bevel gears and reaches a shift-in state, the gum rubber is elastically deformed, and then the claw of the outer cylinder and the claw of the inner cylinder engage with each other, and, as a result, the driving-side part and the driven-side part are connected directly to each other. Thus, the rotation of the drive shaft is transmitted to the propeller shaft through the forward/backward movement switching mechanism, and therefore the propeller rotates, and a thrust is generated in a forward direction or in a backward direction.

The slider of the forward/backward movement switching mechanism of Japanese Unexamined Patent Publication No. 2000-280983 composes a so-called dog clutch together with engagement portions of the pair of front and rear bevel gears. There is a case in which the slider is called a dog clutch. Therefore, in this description, let it be supposed that a member that moves in an axial direction of, for example, the propeller shaft for power transmission is a dog clutch.

In an arrangement in which the shift position is switched by use of the dog clutch as in Japanese Unexamined Patent Publication No. 2000-280983, there is a case in which a so-called shift shock occurs when the dog clutch engages and interlocks with either of the pair of front and rear bevel gears for shift-in. Additionally, there is a case in which when a vessel travels at, for example, a low or intermediate speed in a shift-in state, the dog clutch and the bevel gear are repeatedly brought into contact with or separation from each other because of a change in the rotation speed of the engine, and therefore a so-called rattling noise occurs.

The buffer of Japanese Unexamined Patent Publication No. 2000-280983 restrains a shift shock and a rattling noise by elastic deformation of an elastic portion, i.e., of the gum rubber. However, the present inventor has examined this structure in detail, and, as a result, has understood that, in practice, only a surface portion of the ring-shaped elastic portion merely contributes to the absorption of the shift shock and the absorption of a change in the rotation speed of the engine in spite of the fact that the elastic portion whose surface portion is fastened by baking as in the gum rubber has a comparatively large volume. Therefore, it is desirable to achieve a design that is able to increase the percentage of a part, which contributes to the absorption of the shift shock and the absorption of a change in the rotation speed of the engine, of the elastic portion. This makes it possible to improve the suppression performance of the shift shock and the rattling noise and to restrain the shift shock and the rattling noise with a small-sized structure.

SUMMARY OF THE INVENTION

In order to overcome the previously unrecognized and unsolved challenges described above, a preferred embodiment of the present invention provides an outboard motor including an engine, a propeller shaft, a drive shaft rotated by power of the engine, a coupling, and a transmission to transmit rotation of the drive shaft to the propeller shaft. The propeller shaft rotates together with the propeller. The drive shaft is divided into at least a first shaft and a second shaft that is farther away from the engine than the first shaft. The coupling connects the first shaft and the second shaft together. The transmission includes a rotary body that is rotatable interlockingly with rotation of the second shaft, and a dog clutch that is rotatable interlockingly with the propeller shaft. The dog clutch is movable between a connection position to engage with the rotary body and a disconnection position to disengage from the rotary body. The coupling includes a first portion attached to the first shaft, a second portion attached to the second shaft, and a damper. The first portion includes a plurality of first claws that are arranged along a rotation direction of the drive shaft. The second portion includes a plurality of second claws that are located between adjacent ones of the plurality of first claws in the rotation direction. The damper includes an elastic portion interposed between adjacent ones of the plurality of first claws and the plurality of second claws in the rotation direction.

With this structural arrangement, the rotary body that is rotatable interlockingly with the rotation of the drive shaft runs idle in a state in which the dog clutch that is rotatable interlockingly with the propeller shaft is located in the disconnection position and is spaced apart from the rotary body, and therefore the rotation of the drive shaft is not transmitted to the propeller shaft. The shift position of the outboard motor at this time is hereinafter referred to as "neutral." When the dog clutch moves from the disconnection position to the connection position and engages with the rotary body, the outboard motor is shifted in. Thereupon, the rotation of the drive shaft is transmitted to the propeller shaft through the rotary body and the dog clutch, and, as a result, the propeller shaft rotates together with the propeller, and therefore the propeller generates a thrust.

The drive shaft is divided into at least the first shaft and the second shaft, and the first shaft and the second shaft are connected together by the coupling. The plurality of first claws in the first portion of the coupling and the plurality of second claws in the second portion of the coupling are alternately arranged along the rotation direction of the drive shaft. Furthermore, the elastic portion of the damper of the coupling is interposed between adjacent ones of the plurality of first claws and the plurality of second claws in the rotation direction. With this structural arrangement, when the dog clutch engages with the rotary body for shift-in, most of the elastic portion is compressed between the first claw and the second claw, and is elastically deformed. Therefore, most of the elastic portion contributes to shift-shock absorption when the dog clutch engages with the rotary body. Additionally, most of the elastic portion is elastically deformed, and, as a result, a change in the rotation speed of the engine is effectively reduced. This makes it possible to adjust the dog clutch and the rotary body so as not to be easily disengaged from each other after the shift-in, thus making it possible to efficiently absorb a change in the rotation speed of the engine. As a result, it is possible to restrain a rattling noise caused by allowing both the dog clutch and the rotary body to repeatedly make contact and separation therebetween. Therefore, it is possible to effectively restrain a shift shock and a rattling noise caused by the dog clutch. Additionally, the structure is such that most of the elastic portion contributes to restraining a shift shock and a rattling noise, and therefore it is possible to reduce the volume of the entirety of the elastic portions. This makes it possible to downsize the structure to restrain shift shock and rattling noise.

In a preferred embodiment of the present invention, a plurality of the elastic portions are arranged along the rotation direction. Each of the elastic portions is interposed between a first claw and a second claw that are adjacent to each other in the rotation direction.

With this structural arrangement, most of each of the elastic portions is compressed and is elastically deformed between the first claw and the second claw when the dog clutch engages with the rotary body for shift-in. This enables the coupling to effectively absorb a shift shock caused when the dog clutch engages with the rotary body. Additionally, a change in the rotation speed of the engine is effectively reduced because most of each of the elastic portions is elastically deformed, and therefore it is possible to effectively restrain a rattling noise caused by allowing both the dog clutch and the rotary body to repeatedly make contact and separation therebetween resulting from a change in the rotation speed of the engine. Therefore, it is possible to more effectively restrain a shift shock and a rattling noise caused by the dog clutch.

In a preferred embodiment of the present invention, the damper includes a base portion, and the plurality of elastic portions are integral with the base portion, extend in a radial direction of the drive shaft, and arranged radially around the drive shaft.

With this structural arrangement, the plurality of elastic portions are integral with the base portion, and therefore an operator is able to easily interpose each of the elastic portions between the first claw and the second claw by fitting the base portion into the space surrounded by the plurality of first claws and the plurality of second claws. Additionally, the operator is able to easily remove each of the elastic portions from between the first claw and the second claw by detaching the base portion from the space. Thus, it is also possible to improve the maintainability of the coupling while restraining a shift shock and a rattling noise caused by the dog clutch.

In a preferred embodiment of the present invention, the first claw includes a first inward portion and a first outward portion that extends in the rotation direction from an outer end portion of the first inward portion and that faces inward toward the elastic portion in the radial direction. The first inward portion is located between adjacent ones of the elastic portions in the rotation direction. The second claw includes a second inward portion located between adjacent ones of the elastic portions in the rotation direction and a second outward portion that extends in the rotation direction from an outer end portion of the second inward portion and that faces inward and toward the elastic portion in the radial direction. The first inward portion and the second inward portion are alternately arranged along the rotation direction. The first outward portion and the second outward portion are alternately arranged along the rotation direction.

With this structural arrangement, most of each of the elastic portions is compressed between the first inward portion of the first claw and the second inward portion of the second claw, and is elastically deformed when shifted in, thus making it possible to effectively absorb a shift shock caused when the dog clutch engages with the rotary body. Additionally, a change in the rotation speed of the engine is effectively reduced by the elastic deformation of each of the elastic portions, and therefore it is possible to effectively restrain a rattling noise caused by allowing both the dog clutch and the rotary body to repeatedly make contact and separation therebetween resulting from a change in the rotation speed of the engine. When the elastic portion is further elastically deformed because of an increase in torque of the engine, the first outward portion of the first claw and the second outward portion of the second claw come into contact with each other. This enables the coupling to transmit an increased high torque between the first shaft and the second shaft. Therefore, it is possible to adjust the maximum value of torque to which the elastic portion is adaptable so that the elastic portion does not generate heat because of elastic deformation caused by the high torque, and therefore it is possible to restrain the deterioration of the elastic portion resulting from heat generation and to improve the durability of the elastic portion. Additionally, it is possible to make the elastic portion in a proper size in accordance with that maximum value, and therefore it is possible to downsize the damper. Additionally, it is possible to continue torque transmission between the first shaft and the second shaft because of contact between the first outward portion and the second outward portion even if the elastic portion is broken.

In a preferred embodiment of the present invention, the outer end portion of the first inward portion is connected to a center or an end portion of the first outward portion in the rotation direction. The outer end portion of the second inward portion is connected to a center or an end portion of the second outward portion in the rotation direction. In other words, the coupling is able to have at least two arrangements, i.e., a first arrangement in which the first inward portion is connected to the center of the first outward portion and in which the second inward portion is connected to the center of the second outward portion, and a second arrangement in which the first inward portion is connected to the end portion of the first outward portion and in which the second inward portion is connected to the end portion of the second outward portion.

If the rotation direction of the drive shaft includes a first rotation direction and a second rotation direction that is opposite to the first rotation direction, the first outward portion and the second outward portion come into contact with each other when the torque of the engine is increased according to the first arrangement even if the drive shaft rotates in either of these rotation directions. This enables the coupling to transmit an increased high torque between the first shaft and the second shaft even if the drive shaft rotates either in the first rotation direction or in the second rotation direction.

If the rotation direction of the drive shaft is only one direction, i.e., either the first rotation direction or the second rotation direction, the first inward portion and the second inward portion are spaced apart from each other according to the second arrangement, and therefore it is possible to increase the volume of the portion of the elastic portion that is compressed between the first inward portion and the second inward portion. This makes it possible to more effectively restrain a shift shock and a rattling noise caused by the dog clutch.

In a preferred embodiment of the present invention, an angular range of the elastic portion in the rotation direction is equal to or less than an angular interval between adjacent ones of the first inward portion and the second inward portion in the rotation direction. An angular range of the elastic portion in the rotation direction is equal to or more than an angular interval between adjacent ones of the first outward portion and the second outward portion in the rotation direction.

With this structural arrangement, the elastic portion is interposed between adjacent ones of the first inward portion and the second inward portion in the rotation direction, and is located at a more inward position in the radial direction than adjacent ones of the first outward portion and the second outward portion in the rotation direction. This makes it possible to position the elastic portion both in the rotation direction and in the radial direction. Additionally, the elastic portion does not exist between the first and second outward portions that are adjacent to each other, and therefore the first and second outward portions are able to come into contact with each other when the torque of the engine is increased.

In a preferred embodiment of the present invention, the propeller shaft is located at a lower position than the engine. The drive shaft extends in an up-down direction between the propeller shaft and the engine. The second shaft is located at a lower position than the first shaft. The second shaft is divided into a third shaft to which the second portion is attached and a fourth shaft that is located at a lower position than the third shaft and that is connected to the transmission. At least the propeller, the propeller shaft, the transmission, and the fourth shaft define a lower assembly in the outboard motor.

With this structural arrangement, when a plurality of kinds of outboard motors exist in accordance with, for example, different sized transoms of a vessel to which the outboard motors are attached, the same kinds of lower assemblies are applicable to the plurality of kinds of outboard motors, respectively, if a plurality of kinds of third shafts that differ in size from each other are prepared. This makes it possible to reduce the number of kinds of lower assemblies, thus enabling a manager of, for example, a manufacturer of the outboard motor to easily manage a stock of the lower assemblies.

In a preferred embodiment of the present invention, the outboard motor further includes a propeller damper interposed between the propeller and the propeller shaft.

With this structural arrangement, the inertia force of the propeller is absorbed by the propeller damper, and therefore it is possible to effectively restrain a shift shock and a rattling noise in the dog clutch that are caused by the inertia force of the propeller.

In a preferred embodiment of the present invention, the rotary body includes a first rotary body and a second rotary body arranged side by side in an axial direction of the propeller shaft and that rotate in mutually opposite directions around a rotational axis of the propeller shaft. The dog clutch is movable along the axial direction. The connection position includes a first connection position at which the dog clutch engages with only the first rotary body and a second connection position at which the dog clutch engages with only the second rotary body.

With this structural arrangement, when the dog clutch moves from the disconnection position to the first connection position and engages with the first rotary body, the outboard motor whose shift position is neutral is shifted in, for example, forward. Thereupon, the rotation of the drive shaft is transmitted to the propeller shaft through the rotary body and the dog clutch, and, as a result, the propeller shaft rotates together with the propeller, and therefore the propeller generates a forward thrust. On the other hand, when the dog clutch moves from the disconnection position to the second connection position and engages with the second rotary body, the outboard motor in a neutral state is shifted in backward. Thereupon, the rotation of the drive shaft is transmitted to the propeller shaft through the rotary body and the dog clutch, and, as a result, the propeller shaft rotates together with the propeller, and therefore the propeller generates a backward thrust.

The elastic portion of the damper of the coupling is interposed between the first claw and the second claw that are adjacent to each other in the rotation direction. With this structural arrangement, even when the shift-in is either "forward" or "backward," most of the elastic portion is compressed between the first claw and the second claw, and is elastically deformed. Therefore, most of the elastic portion contributes to shift-shock absorption when the dog clutch engages with the rotary body. Additionally, most of the elastic portion is elastically deformed, and, as a result, a change in the rotation speed of the engine is effectively reduced. Thus, the dog clutch and the rotary body are not easily disengaged from each other after the shift-in, and therefore it is possible to restrain a rattling noise caused by allowing both the dog clutch and the rotary body to repeatedly make contact and separation therebetween resulting from a change in the rotation speed of the engine. Therefore, it is possible to effectively restrain a shift shock and a rattling noise caused by the dog clutch.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
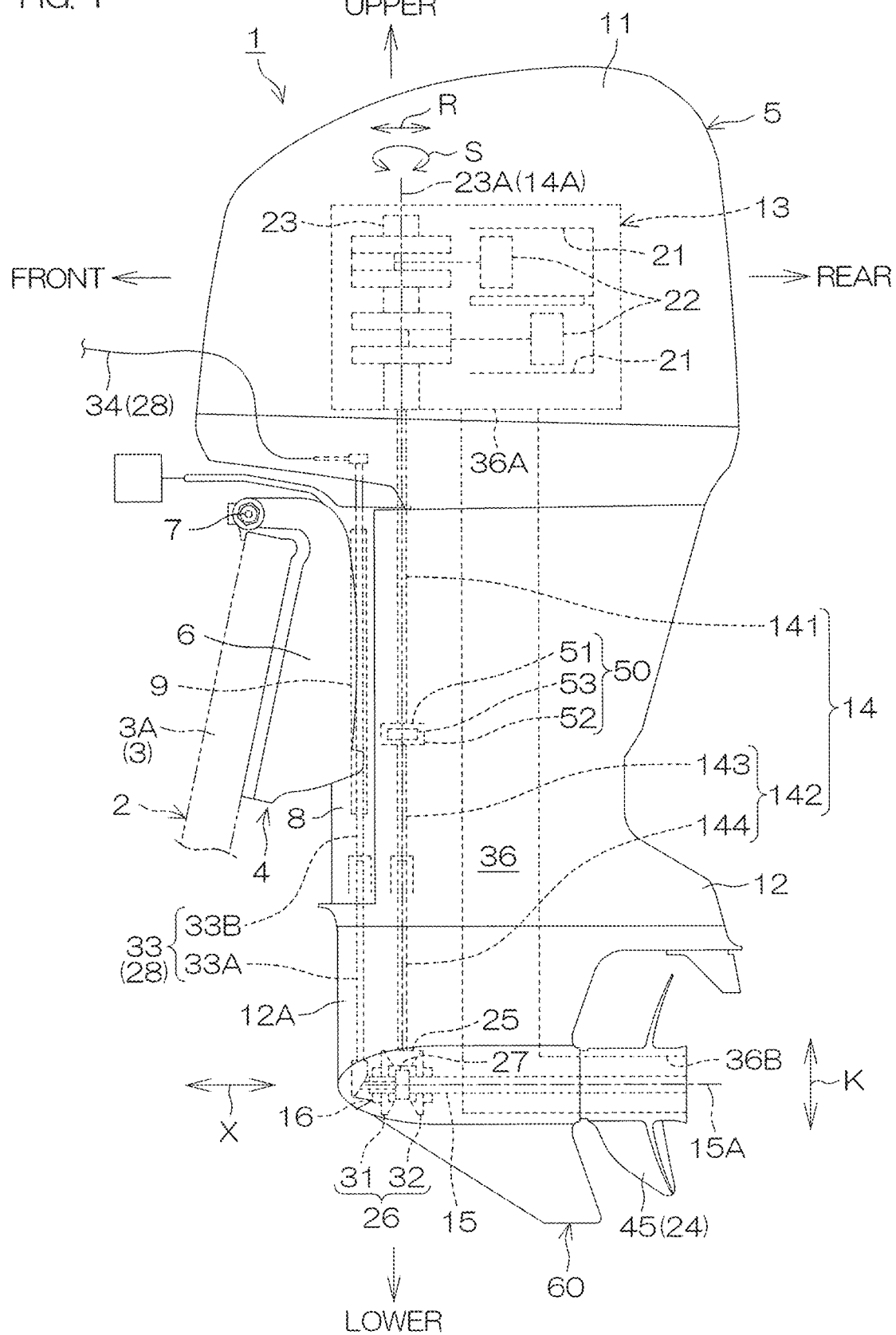
FIG. 1 is a schematic side view of an outboard motor according to a preferred embodiment of the present invention.

Preferred embodiments of the present invention will be hereinafter described in detail with reference to the accompanying drawings. FIG. 1 is a schematic left side view of an outboard motor according to a preferred embodiment of the present invention. The left-hand side in FIG. 1 is the front of the outboard motor 1, and the right-hand side in FIG. 1 is the rear of the outboard motor 1. The near side in a direction perpendicular to the plane of paper of FIG. 1 is the left of the outboard motor 1, and the far side in the direction perpendicular to the plane of paper of FIG. 1 is the right of the outboard motor 1.

The outboard motor 1 includes an attachment mechanism 4 that attaches the outboard motor 1 to a transom 3A of a hull 3 of a vessel 2 and an outboard motor body 5. The attachment mechanism 4 includes a clamp bracket 6 fixed to the transom 3A and a swivel bracket 8 connected to the clamp bracket 6 through a tilt shaft 7 extending horizontally in a left-right direction. The swivel bracket 8 is connected to the outboard motor body 5 through a steering shaft 9 extending in an up-down direction. Thus, the outboard motor body 5 is attached to the transom 3A by the attachment mechanism 4 in a substantially vertical attitude.

The outboard motor body 5 and the swivel bracket 8 are turnable around the tilt shaft 7 in the up-down direction with respect to the clamp bracket 6. The outboard motor body 5 is turned around the tilt shaft 7, and, as a result, the outboard motor body 5 is tilted with respect to the hull 3 and the clamp bracket 6. The outboard motor body 5 is turnable in the left-right direction together with the steering shaft 9 with respect to the clamp bracket 6 and the swivel bracket 8. When the outboard motor body 5 turns in the left-right direction, the vessel 2 is steered.

The outboard motor body 5 includes a box-shaped engine cover 11 and a hollow casing 12 that extends downwardly from the engine cover 11. A lower end portion of the casing 12 defines a lower case 12A. The outboard motor body 5 includes an engine 13 housed in the engine cover 11, a drive shaft 14 that extends downwardly from the engine 13 and most of which is located in the casing 12, and a propeller shaft 15 and a transmission mechanism 16 that are located in the lower case 12A at a lower position than the engine 13.

The engine 13 is an internal combustion engine that generates power while burning fuel, such as gasoline, and that contains a combustion chamber 21, a piston 22 located in the combustion chamber 21, and a crankshaft 23 connected to the piston 22. The crankshaft 23 has a crankshaft axis 23A extending in the up-down direction. A lower end portion of the crankshaft 23 is connected to an upper end portion of the drive shaft 14. The combustion of an air-fuel mixture in the combustion chamber 21 enables the piston 22 to rectilinearly reciprocate in the front-rear direction perpendicular to the crankshaft axis 23A.

The drive shaft 14 extends in the up-down direction between the propeller shaft 15 and the engine 13, which is described in detail below. When the piston 22 rectilinearly reciprocates, the crankshaft 23 is driven and rotated around the crankshaft axis 23A along with the drive shaft 14. In other words, the drive shaft 14 rotates by the power of the engine 13. When seen from above, the rotation direction of both the crankshaft 23 and the drive shaft 14 is, for example, a clockwise direction, and the rotational axis 14A of the drive shaft 14 coincides with the crankshaft axis 23A. The radial direction based on the rotational axis 14A is hereinafter referred to as the radial direction R of the drive shaft 14. The inward direction of the radial direction R is a direction approaching the rotational axis 14A, whereas the outward direction of the radial direction R is a direction away from the rotational axis 14A.

Figure 2:
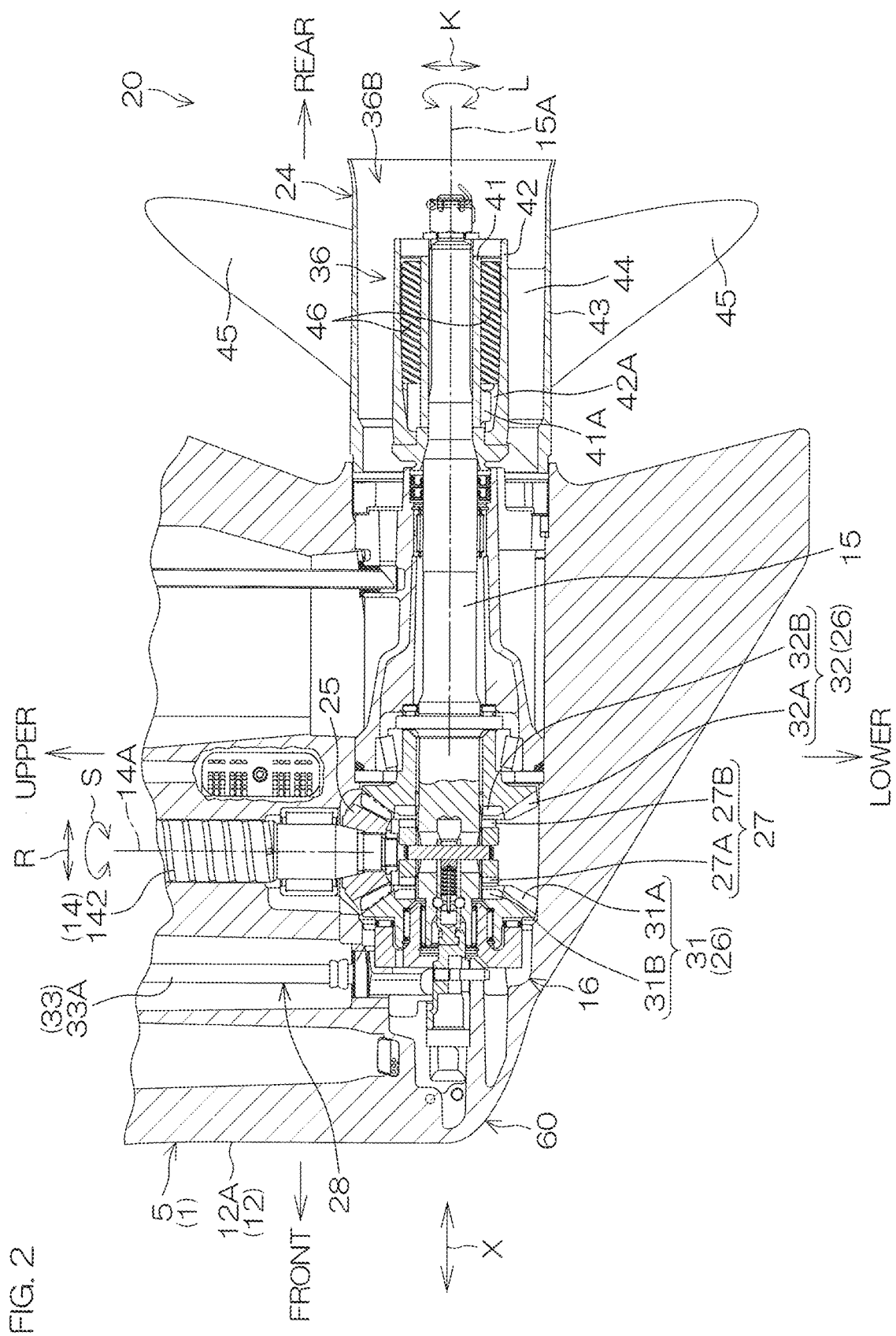
FIG. 2 is a longitudinal sectional view of a lower portion of the outboard motor.

FIG. 2 is a longitudinal sectional view of a lower portion of the outboard motor 1. In FIG. 2, the hatching of a cross-section portion of each of the members, which include the lower case 12A and the like, is omitted. The propeller shaft 15 extends in the front-rear direction in the lower case 12A. Therefore, the axial direction X of the propeller shaft 15 is the front-rear direction. A lower end portion of the drive shaft 14 is connected to a front end portion of the propeller shaft 15 by the transmission mechanism 16. A rear end portion of the propeller shaft 15 protrudes rearwardly from the lower case 12A. A propeller 24 is attached to the rear end portion of the propeller shaft 15. The propeller shaft 15 rotates together with the propeller 24 around a rotational axis 15A that extends in the front-rear direction.

The transmission mechanism 16 transmits the rotation of the drive shaft 14 to the propeller shaft 15. The transmission mechanism 16 includes a driving gear 25 fixed to the lower end portion of the drive shaft 14, a rotary body 26 and a dog clutch 27 that are attached to the front end portion of the propeller shaft 15, and a shift mechanism 28 located in the lower case 12A at a more forward position than the propeller shaft 15. The driving gear 25 is a bevel gear. The propeller shaft 15 is located below the driving gear 25. The rotary body 26 includes a first rotary body 31 and a second rotary body 32 that are arranged side by side in the front-rear direction along the propeller shaft 15. The first rotary body 31 and the second rotary body 32 are, for example, cylindrical bevel gears.

In the present preferred embodiment, the first rotary body 31 is located at a more forward position than the driving gear 25, and the second rotary body 32 is located at a more rearward position than the driving gear 25, and yet the front-rear positional relationship between the first rotary body 31 and the second rotary body 32 may be opposite to that of the present preferred embodiment. In a rear surface of the first rotary body 31, a tooth portion 31A is provided at a tapered outer peripheral portion, and a claw portion 31B is provided at an inner peripheral portion. In a front surface of the second rotary body 32, a tooth portion 32A is provided at a tapered outer peripheral portion, and a claw portion 32B is provided at an inner peripheral portion.

The first rotary body 31 surrounds a portion, which is at a more forward position than the driving gear 25, of the front end portion of the propeller shaft 15, and the second rotary body 32 surrounds a portion, which is at a more rearward position than the driving gear 25, of the front end portion of the propeller shaft 15. The first rotary body 31 and the second rotary body 32 are located so that their tooth portions 31A and 32A face each other with an interval therebetween in the front-rear direction, and these rotary bodies engage with the driving gear 25. When the driving gear 25 rotates in unison with the drive shaft 14 in response to the driving of the engine 13, the rotation of the driving gear 25 is transmitted to the first and second rotary bodies 31 and 32. Thus, the first and second rotary bodies 31 and 32 rotate in mutually opposite directions around the rotational axis 15A of the propeller shaft 15.

The dog clutch 27 is located between the first and second rotary bodies 31 and 32. The dog clutch 27 is, for example, cylindrical, and surrounds the front end portion of the propeller shaft 15. A first claw portion 27A is provided at a front end surface of the dog clutch 27, and a second claw portion 27B is provided at a rear end surface of the dog clutch 27. The dog clutch 27 is connected to the front end portion of the propeller shaft 15 by, for example, a spline. Therefore, the dog clutch 27 rotates together with the front end portion of the propeller shaft 15. In other words, the dog clutch 27 rotates interlockingly with the propeller shaft 15. Additionally, the dog clutch 27 is movable in the front-rear direction with respect to the front end portion of the propeller shaft 15. In other words, the dog clutch 27 is rotatable in unison with the propeller shaft 15, and is movable relatively to the propeller shaft 15 in the front-rear direction.

The shift mechanism 28 includes, for example, a shift rod 33 extending in the up-down direction and an operation cable 34 joined to the shift rod 33 (see FIG. 1). A lower end portion of the shift rod 33 is connected to the dog clutch 27. The shift rod 33 turns around an axis of the shift rod 33 by an operating force input from the operation cable 34. The dog clutch 27 is moved in the front-rear direction between the disconnection position and the connection position by turning the shift rod 33.

The disconnection position is a position in which the dog clutch 27 is separated from the first and second rotary bodies 31 and 32, and does not engage with any of the first and second rotary bodies 31 and 32 (the rotary body 26). Each of the rotary bodies 26 to which the rotation of the drive shaft 14 is transmitted runs idle in a state in which the dog clutch 27 is located in the disconnection position, and therefore the rotation of the drive shaft 14 is not transmitted to the propeller shaft 15. The shift position of the outboard motor 1 at this time is hereinafter referred to as "neutral."

The connection position is a position in which the dog clutch 27 engages with either of the first and second rotary bodies 31 and 32. The connection position includes a first connection position in which the first claw portion 27A of the dog clutch 27 engages with only the claw portion 31B of the first rotary body 31 and a second connection position in which the second claw portion 27B of the dog clutch 27 engages with only the claw portion 32B of the second rotary body 32. The disconnection position is a position between the first connection position and the second connection position. The first connection position is more forward than the disconnection position, whereas the second connection position is more rearward than the disconnection position.

In a state in which the dog clutch 27 is located in the first connection position and is connected to only the first rotary body 31, the rotation of the first rotary body 31 is transmitted to the propeller shaft 15, and therefore the shift position of the outboard motor 1 is shifted in "forward." Thereupon, the rotation of the drive shaft 14 is transmitted to the propeller shaft 15 through the first rotary body 31 and the dog clutch 27, and, as a result, the propeller 24 rotates in a forward rotational direction (for example, clockwise when seen from the rear side). Thus, the propeller 24 generates a forward thrust.

In a state in which the dog clutch 27 is located in the second connection position and is connected to only the second rotary body 32, the rotation of the second rotary body 32 is transmitted to the propeller shaft 15, and therefore the shift position of the outboard motor 1 is shifted in "backward." Thereupon, the rotation of the drive shaft 14 is transmitted to the propeller shaft 15 through the second rotary body 32 and the dog clutch 27, and, as a result, the propeller 24 rotates in a backward rotational direction opposite to the forward rotational direction. Thus, the propeller 24 generates a backward thrust. As thus described, in the present preferred embodiment, the first rotary body 31 is a gear for forward movement, and the second rotary body 32 is a gear for backward movement. Of course, the first rotary body 31 may be a gear for backward movement, and the second rotary body 32 may be a gear for forward movement.

The outboard motor body 5 includes an exhaust passage 36 located inside the outboard motor body 5, and the exhaust passage 36 includes an inlet 36A connected to the engine 13 and an outlet 36B located at the propeller 24 (see FIG. 1). In a state in which the vessel 2 is floating on water and in which the propeller 24 is at a lower position than a water surface, the outlet 36B is positioned in the water, and therefore the water that has passed through the outlet 36B enters a downstream portion of the exhaust passage 36. On the other hand, when the engine 13 rotates at a high speed, the water in the exhaust passage 36 is pushed by the pressure of an exhaust gas from the engine 13, and is discharged from the outlet 36B together with the exhaust gas. Thus, the exhaust gas generated by the engine 13 is discharged into the water.

A circularly cylindrical bush 41 is spline-coupled to the rear end portion of the propeller shaft 15. The bush 41 may be regarded as a portion of the rear end portion of the propeller shaft 15. A plurality of projections 41A that protrude outwardly in a radial direction K with respect to the rotational axis 15A of the propeller shaft 15 are located at a front end portion of an outer peripheral surface of the bush 41. These projections 41A are arranged at equal or substantially equal intervals in a circumferential direction L around the rotational axis 15A.

The propeller 24 includes a circular inner cylinder 42 that surrounds the bush 41, a circular outer cylinder 43 that surrounds the inner cylinder 42, a plurality of ribs 44 that connect an outer peripheral surface of the inner cylinder 42 and an inner peripheral surface of the outer cylinder 43, and a plurality of blades 45 that protrude outwardly in the radial direction K from an outer peripheral surface of the outer cylinder 43. A plurality of projections 42A that protrude inwardly in the radial direction K and that are arranged at equal or substantially equal intervals in the circumferential direction L are located at a front end portion of an inner peripheral surface of the inner cylinder 42. The projection 41A of the bush 41 and the projection 42A of the inner cylinder 42 are alternately arranged in the circumferential direction L. A gap in the radial direction K between the inner cylinder 42 and the outer cylinder 43 defines a portion of the exhaust passage 36, and an opening of a rear end surface of the outer cylinder 43 defines the outlet 36B of the exhaust passage 36. The plurality of ribs 44 are arranged side by side in the circumferential direction L, and the plurality of blades 45 are arranged side by side in the circumferential direction L. When the propeller 24 rotates, the blades 45 generate a thrust.

The outboard motor 1 may additionally include a propeller damper 46 that is interposed between the propeller shaft 15 and the propeller 24. The propeller damper 46 is a circularly cylindrical body made of an elastic material, such as rubber or resin, and is located between the bush 41 and the inner cylinder 42 of the propeller 24. An inner peripheral surface of the propeller damper 46 is fixed to a more rearward area than the projection 41A in the outer peripheral surface of the bush 41 by, for example, cure adhesion. An outer peripheral surface of the propeller damper 46 is, for example, spline-coupled to a more rearward area than the projection 42A in the inner peripheral surface of the inner cylinder 42.

Torque is transmitted between the bush 41 and the inner cylinder 42 when the propeller 24 rotates. When torque is low, this torque is transmitted between the bush 41 and the inner cylinder 42 through the propeller damper 46. In that case, the projection 41A of the bush 41 and the projection 42A of the inner cylinder 42 do not come into contact with each other. On the other hand, when torque becomes high, the propeller damper 46 is elastically deformed, and, as a result, the projection 41A and the projection 42A that are adjacent to each other in the circumferential direction L come into contact with each other, and therefore the torque is transmitted between the bush 41 and the inner cylinder 42 through the projections 41A and 42A. When the dog clutch 27 engages with the rotary body 26 or disengages from the rotary body 26, a shock, which is called a shift shock, occurs. Additionally, when the propeller 24 comes into contact with an obstacle in water, a shock occurs. These shocks are absorbed by the elastic deformation of the propeller damper 46.

The drive shaft 14 is divided into at least a first shaft 141 and a second shaft 142, and the second shaft 142 is coaxially disposed at a lower position than the first shaft 141 (see FIG. 1). The first shaft 141 is positioned on the upstream side closer to the engine 13, and the second shaft 142 is positioned on the downstream side more distant from the engine 13 than the first shaft 141. The driving gear 25 is fixed to a lower end portion of the second shaft 142. Therefore, the rotary body 26 (first and second rotary bodies 31 and 32) engaging with the driving gear 25 rotates interlockingly with the rotation of the second shaft 142 and the rotation of the driving gear 25.

The outboard motor 1 includes a coupling 50 that connects the first shaft 141 and the second shaft 142 together. The coupling 50 is located downwardly away from the engine 13, and in a more rearward space than the shift rod 33 in the casing 12, and therefore the effective use of this space makes it possible to restrain the enlargement of the outboard motor body 5 in the up-down direction.

Figure 3:
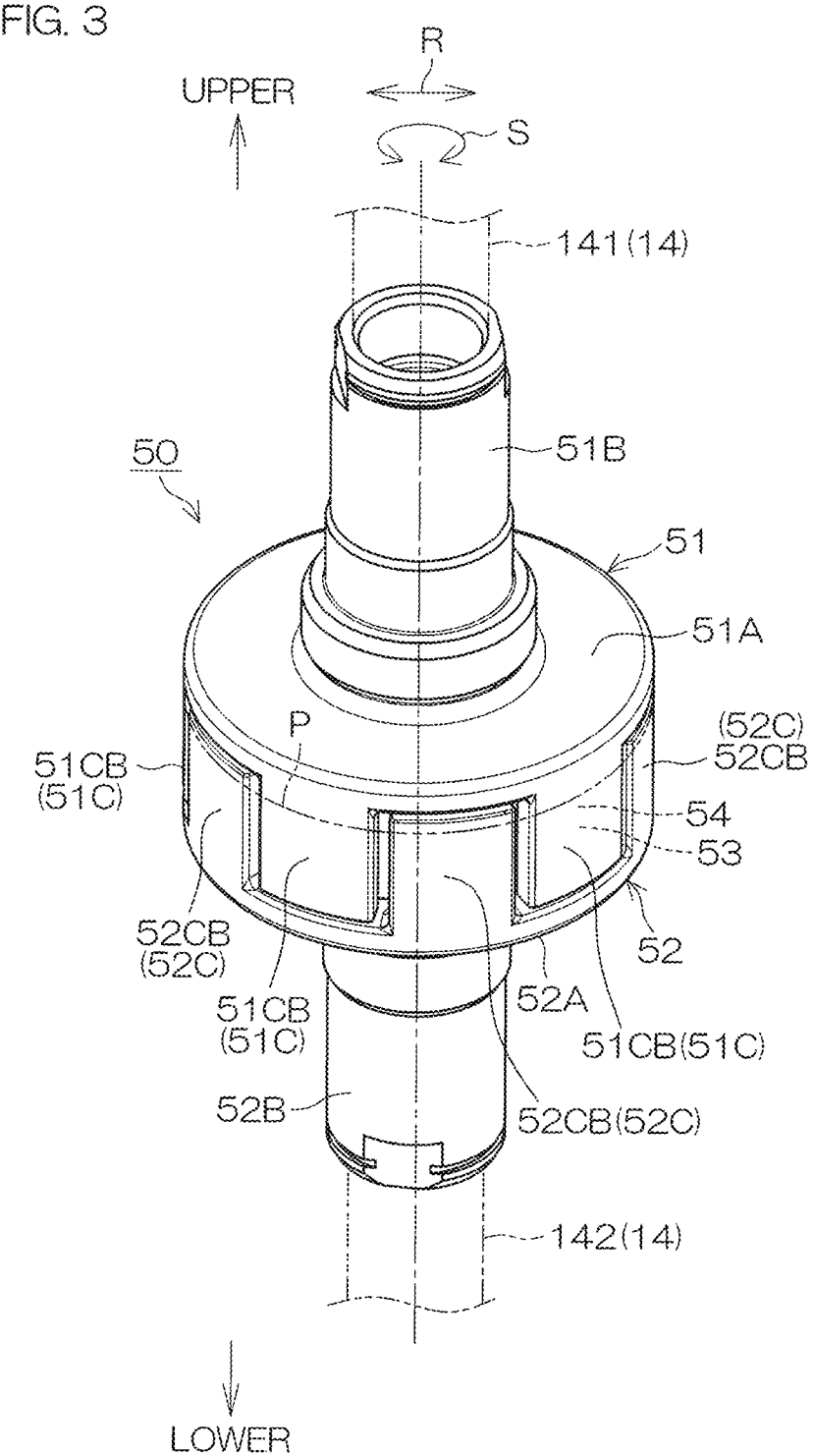
FIG. 3 is a perspective view of a coupling included in the outboard motor.

FIG. 3 is a perspective view of the coupling 50. The coupling 50 includes a metallic first portion 51 attached to a lower end portion of the first shaft 141, a metallic second portion 52 attached to an upper end portion of the second shaft 142, and a damper 53 that is located between the first portion 51 and the second portion 52 and that is made of an elastic material.

Figure 4:
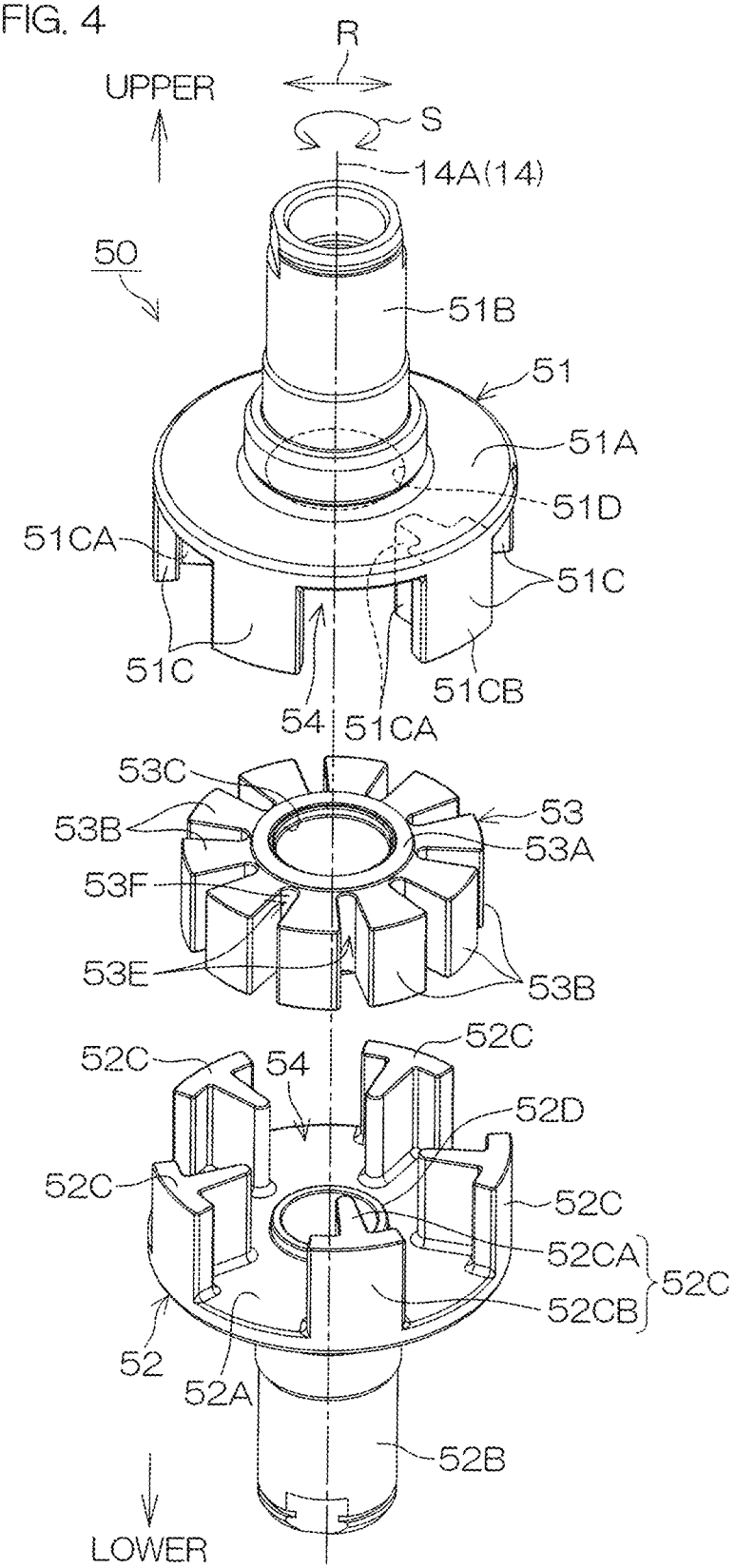
FIG. 4 is an exploded perspective view of the coupling.

FIG. 4 is an exploded perspective view of the coupling 50. The first portion 51 includes a disk portion 51A disposed coaxially with the rotational axis 14A of the drive shaft 14, a circular tube portion 51B that coaxially protrudes upwardly from the center of an upper surface of the disk portion 51A, and a plurality of first claws 51C that protrude downwardly from an outer peripheral portion of a lower surface of the disk portion 51A. An annular positioning rib 51D that protrudes downwardly is located at the center of the lower surface of the disk portion 51A. The lower end portion of the first shaft 141 is inserted from above and is fixed to the circular tube portion 15B. Thus, the first portion 51 rotates together with the first shaft 141.

As an example, five first claws 51C are arranged at equal or substantially equal intervals along the rotation direction S of the drive shaft 14 in FIG. 4. Each of the first claws 51C includes a first inward portion 51CA that extends inwardly in the radial direction R of the drive shaft 14 from an outer peripheral edge of the disk portion 51A and a first outward portion 51CB that extends in the rotation direction S from an outer end portion in the radial direction R of the first inward portion 51CA. The whole area of each upper end of the first inward and outward portions 51CA and 51CB is connected to the lower surface of the disk portion 51A.

Referring to the first inward portion 51CA shown by the broken line in FIG. 4, the width of the first inward portion 51CA in the rotation direction S gradually becomes smaller in proportion to an inward progression in the radial direction R. An inner end portion in the radial direction R of the first inward portion 51CA is rounded in the shape of a circular arc that bulges inwardly in the radial direction R, and is located at a more outward position in the radial direction R than the positioning rib 51D at the center of the lower surface of the disk portion 51A. All corner portions of the first claw 51C are rounded without being exclusively limited to the first inward portion 51CA.

The first outward portion 51CB has the shape of a circular arc that extends along an outer peripheral edge of the disk portion 51A. An outer end portion in the radial direction R of the first inward portion 51CA is connected to the center of the first outward portion 51CB in the rotation direction S, and a lower surface of the first inward portion 51CA and a lower surface of the first outward portion 51CB are horizontally flush with each other. This first claw 51C has the shape of the letter T when seen from the up-down direction, i.e., when seen from the axial direction of the drive shaft 14.

The second portion 52 corresponds to the first portion 51 when inverted in the up-down direction. The second portion 52 includes a disk portion 52A disposed coaxially with the rotational axis 14A of the drive shaft 14, a circular tube portion 52B that protrudes downwardly from the center of a lower surface of the disk portion 52A coaxially, and a plurality of second claws 52C that protrude upwardly from an outer peripheral portion of an upper surface of the disk portion 52A. An annular positioning rib 52D that protrudes upwardly is located at the center of an upper surface of the disk portion 52A. The upper end portion of the second shaft 142 is inserted into the circular tube portion 52B from below, and is fixed. Thus, the second portion 52 rotates together with the second shaft 142.

The second claws 52C, which are equal in number to the first claws 51, are arranged at equal or substantially equal intervals along the rotation direction S. Each of the second claws 52C includes a second inward portion 52CA that extends inwardly in the radial direction R from an outer peripheral edge of the disk portion 52A and a second outward portion 52CB that extends in the rotation direction S from an outer end portion in the radial direction R of the second inward portion 52CA. The whole area of each lower end of the second inward and outward portions 52CA and 52CB is connected to the upper surface of the disk portion 52A.

The width of the second inward portion 52CA in the rotation direction S gradually becomes smaller in proportion to an inward progression in the radial direction R. An inner end portion in the radial direction R of the second inward portion 52CA is rounded in the shape of a circular arc that bulges inwardly in the radial direction R, and is located at a more outward position in the radial direction R than the positioning rib 52D at the center of the upper surface of the disk portion 52A. All corner portions of the second claw 52C are rounded without being exclusively limited to the second inward portion 52CA.

The second outward portion 52CB has the shape of a circular arc that extends along an outer peripheral edge of the disk portion 52A. An outer end portion in the radial direction R of the second inward portion 52CA is connected to the center of the second outward portion 52CB in the rotation direction S, and an upper surface of the second inward portion 52CA and an upper surface of the second outward portion 52CB are horizontally flush with each other. This second claw 52C has the shape of the letter T when seen from the up-down direction.

The damper 53 is a gear-shaped integrally-molded piece that has a solid circularly-cylindrical base portion 53A disposed coaxially with the rotational axis 14A of the drive shaft 14 and a plurality of elastic portions 53B that are integrally joined to the base portion 53A, extend along the radial direction R, and that are disposed radially around the drive shaft 14. A shallow, circular positioning hole 53C is provided in an upper surface and in a lower surface of the base portion 53A. Each of the positioning holes 53C is larger in diameter than or is equal in diameter to the positioning ribs 51D and 52D of the first and second portions 51 and 52.

The elastic portions 53B, the number (as an example, ten in FIG. 4) of which is double the number of first claws 51C, are arranged at equal or substantially equal intervals along the rotation direction S. A groove 53E that is hollowed inwardly in the radial direction R is provided between the elastic portions 53B adjacent to each other in the rotation direction S. The grooves 53E, the number of which is equal to the number of the elastic portions 53B, are arranged at equal or substantially equal intervals along the rotation direction S. Each of the grooves 53E is opened upwardly, downwardly, and outwardly in the radial direction R. A groove bottom 53F positioned at an inward position in the radial direction R in each of the grooves 53E is rounded in the shape of a circular arc that bulges inwardly in the radial direction R.

Each of the elastic portions 53B is a block-shaped element extending longitudinally in the up-down direction. The width of the elastic portion 53B in the rotation direction S gradually becomes larger in proportion to an outward progression in the radial direction R. An upper surface and a lower surface of the elastic portion 53B extend horizontally. The upper surface of the elastic portion 53B is located at a lower position than an outer peripheral portion, which surrounds the positioning hole 53C, of the upper surface of the base portion 53A. The lower surface of the elastic portion 53B is located at a higher position than an outer peripheral portion, which surrounds the positioning hole 53C, of the lower surface of the base portion 53A (not shown). An outer end surface in the radial direction R of the elastic portion 53B is curved along the rotation direction S.

Figure 5:
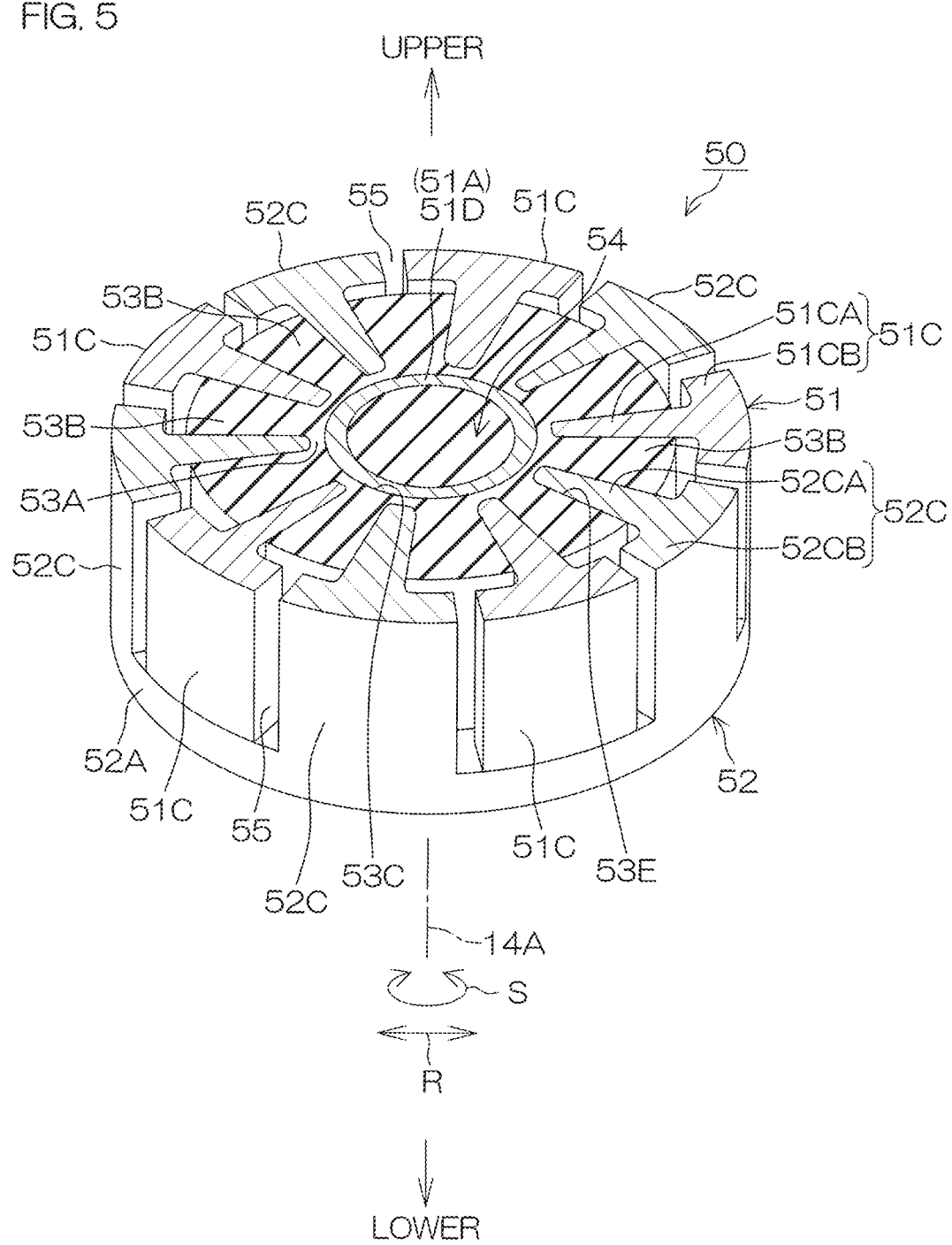
FIG. 5 is a perspective view of the coupling, a portion of which is depicted as a cross section.

FIG. 5 is a partial perspective view of the coupling 50, a portion of which is depicted by a cross section. The hatching of FIG. 5 shows a cross section when cut by a horizontal plane passing through the alternate long and two short dashed line P of FIG. 3. When the coupling 50 has been completed, the second portion 52 is positioned below the first portion 51, and the second claws 52C of the second portion 52 are located between each of the first claws 51C along the rotation direction S in the first portion 51. In this state, the first inward portion 51CA of the first claw 51C and the second inward portion 52CA of the second claw 52C are alternately arranged along the rotation direction S, whereas the first outward portion 51CB of the first claw 51C and the second outward portion 52CB of the second claw 52C are alternately arranged along the rotation direction S.

The damper 53 is located between the first portion 51 and the second portion 52. In the damper 53, the base portion 53A is located in a space 54 surrounded by the first claw 51C of the first portion 51 and the second claw 52C of the second portion 52, and each of the elastic portions 53B is interposed between the first claw 51C and the second claw 52C that are adjacent to each other along the rotation direction S. The space 54 is blocked by the disk portion 51A of the first portion 51 and by the disk portion 52A of the second portion 52 from the up-down direction (see FIG. 4). The positioning rib 51D of the disk portion 51A is fitted into the positioning hole 53C of the upper surface of the base portion 53A, and the positioning rib 52D (not shown) of the disk portion 52A is fitted into the positioning hole 53C of the lower surface of the base portion 53A. Thus, the damper 53 is positioned in the up-down direction and in the radial direction R.

Figure 6:
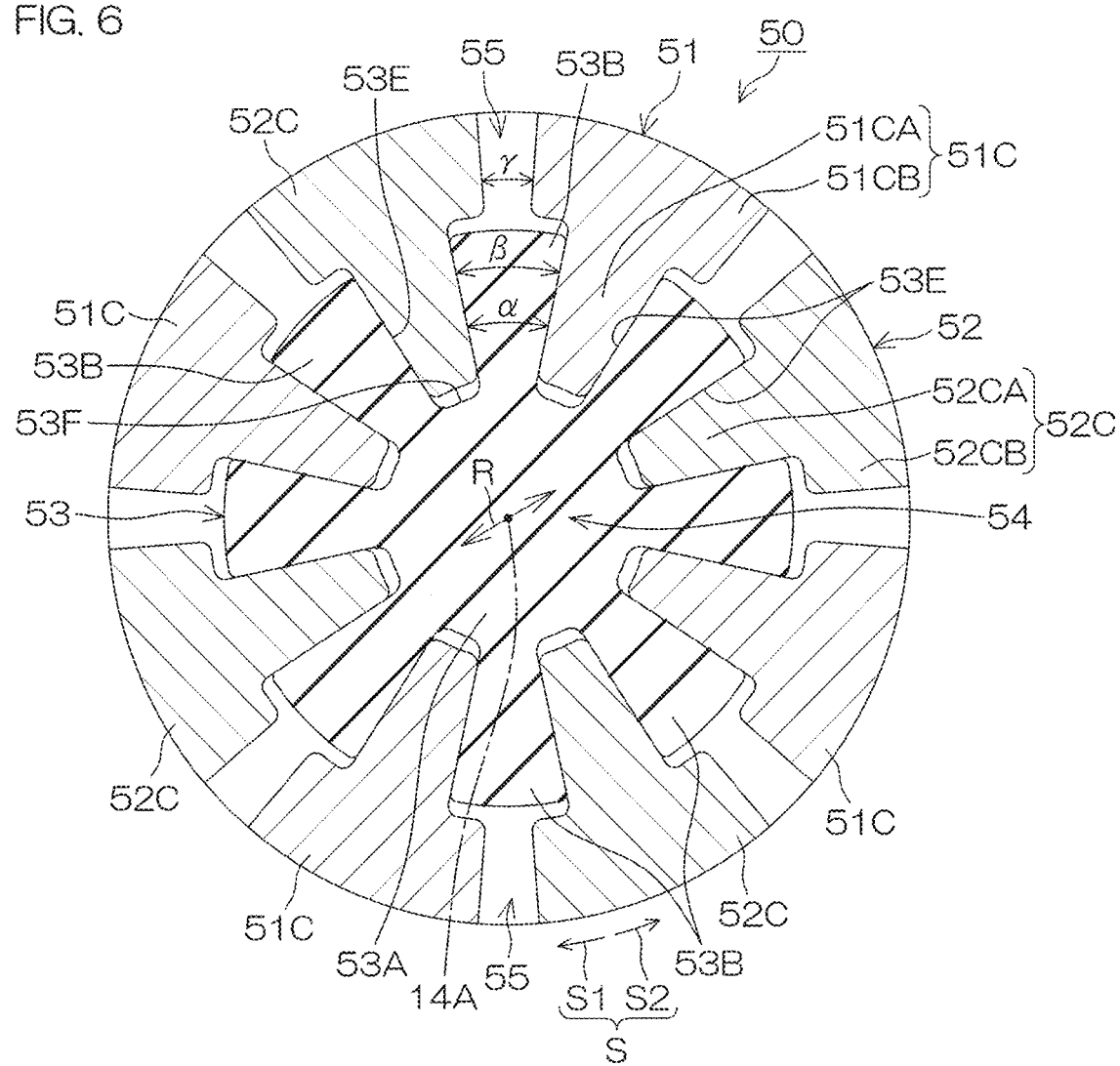
FIG. 6 is a plan cross-sectional view of the coupling.

FIG. 6 is a plan cross-sectional view of the coupling 50. The coupling 50 of FIG. 6 differs from the coupling 50 of FIG. 3 to FIG. 5 in the number of the first claws 51C of the first portion 51, in the number of the second claws 52C of the second portion 52, and in the number of the elastic portions 53B of the damper 53, and, except for this difference, the coupling 50 of FIG. 6 is configured in the same way as the coupling 50 of FIG. 3 to FIG. 5. In the first claw 51C of the first portion 51, a single first inward portion 51CA is located in the groove 53E between two elastic portions 53B adjacent to each other in the rotation direction S, and the first outward portion 51CB faces these elastic portions 53B from the outward side in the radial direction R. In the second claw 52C of the second portion 52, a single second inward portion 52CA is located in a different groove 53E differing from the groove 53E in which the first inward portion 51CA is located, and the second outward portion 52CB faces the two elastic portions 53B, between which the different groove 53E is interposed, from the outward side in the radial direction R.

When the shift position of the outboard motor 1 is neutral due to the dog clutch 27 being in the disconnection position, the first outward portion 51CB of the first claw 51C and the second outward portion 52CB of the second claw 52C are adjacent to each other with a gap 55 therebetween as shown in FIG. 6. The gaps 55 have a number that is equal to that of the elastic portions 53B of the damper 53. The plurality of gaps 55 each of which has a predetermined size in the rotation direction S are arranged at equal or substantially equal intervals along the rotation direction S. In this state, the angular range α of each of the elastic portions 53B in the rotation direction S is equal to or less than the angular interval β between the first inward portion 51CA and the second inward portion 52CA adjacent to each other in the rotation direction S, and is equal to or more than the angular interval γ between the first outward portion 51CB and the second outward portion 52CB adjacent to each other in the rotation direction S. Each of the elastic portions 53B at this time may be compressed by the first inward portion 51CA and the second inward portion 52CA that are adjacent to each other.

Figure 7:
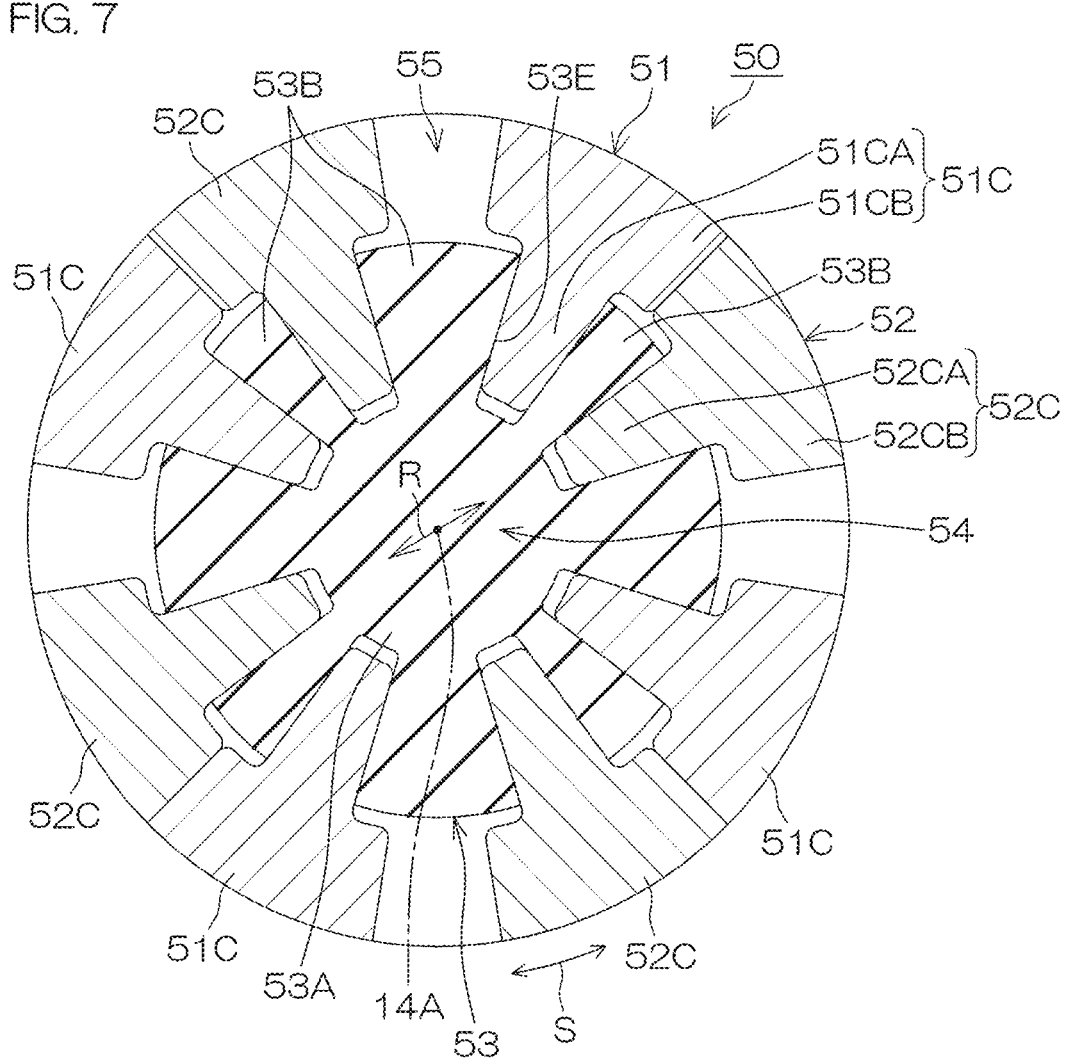
FIG. 7 is a plan cross-sectional view of the coupling when a drive shaft included in the outboard motor rotates.

In the drive shaft 14 rotated by the power of the engine 13, torque is transmitted between the first portion 51 on the first-shaft-141 side and the second portion 52 on the second-shaft-142 side through each of the elastic portions 53B of the damper 53. When the torque of the drive shaft 14 increases because of a rise in the output of the engine 13 after the dog clutch 27 moves to the first connection position or the second connection position, the first portion 51 and the second portion 52 relatively move in the rotation direction S. Thus, each of the elastic portions 53B is compressed by the first inward portion 51CA and by the second inward portion 52CA. As an example, when the first portion 51 moves relatively with respect to the second portion 52 so as to move in a clockwise direction in a plan view, half of the gaps 55 disappear among all of the plurality of gaps 55 described above as shown in FIG. 7, and the remaining half of the gaps 55 that were arranged alternately with those gaps 55, respectively, in the rotation direction S spread in the rotation direction S. Thus, the first outward portion 51CB and the second outward portion 52CB come into contact with each other, and therefore the torque is directly transmitted between the first portion 51 and the second portion 52 without being transmitted through each of the elastic portions 53B of the damper 53.

As described above, according to the present preferred embodiment, the elastic portion 53B of the damper 53 of the coupling 50 is interposed between the first claw 51C and the second claw 52C that are adjacent to each other in the rotation direction S. If this arrangement is used, most of the elastic portion 53B is compressed between the first claw 51C and the second claw 52C, and is elastically deformed even if the shift-in is either "forward" or "backward." Therefore, most of the elastic portion 53B contributes to the absorption of a shift shock caused when the dog clutch 27 engages with the rotary body 26. Additionally, most of the elastic portion 53B is elastically deformed, and, as a result, a change in the rotation speed of the engine 13 is effectively reduced. This makes it possible to adjust the dog clutch 27 and the rotary body 26 so as not to be easily disengaged from each other after the shift-in, thus making it possible to efficiently absorb a change in the rotation speed of the engine 13. As a result, it is possible to restrain a rattling noise caused by allowing both the dog clutch 27 and the rotary body 26 to repeatedly make contact and separation therebetween. Therefore, it is possible to effectively restrain a shift shock and a rattling noise caused by the dog clutch 27. Additionally, the structure is such that most of the elastic portion 53B contributes to restraining a shift shock and a rattling noise, and therefore it is possible to reduce the volume of the entirety of the elastic portions 53B. This makes it possible to downsize the coupling 50 that restrains a shift shock and a rattling noise.

In the present preferred embodiment, the plurality of elastic portions 53B are arranged along the rotation direction S. Each of the elastic portions 53B is interposed between the first claw 51C and the second claw 52C that are adjacent to each other in the rotation direction S.

With this structural arrangement, most of each of the elastic portions 53B is compressed and is elastically deformed between the first claw 51C and the second claw 52C when the dog clutch 27 engages with the rotary body 26 for shift-in. This enables the coupling 50 to effectively absorb a shift shock caused when the dog clutch 27 engages with the rotary body 26. Additionally, a change in the rotation speed of the engine 13 is effectively reduced because most of each of the elastic portions 53B is elastically deformed, and therefore it is possible to effectively restrain a rattling noise caused by allowing both the dog clutch 27 and the rotary body 26 to repeatedly make contact and separation therebetween resulting from a change in the rotation speed of the engine 13. Therefore, it is possible to more effectively restrain a shift shock and a rattling noise caused by the dog clutch 27. The number of the elastic portions 53B can be arbitrarily set, and may be only one.

In the present preferred embodiment, the inertia force of the propeller 24 is also absorbed by the propeller damper 46, and therefore it is possible to effectively restrain a shift shock and a rattling noise in the dog clutch 27 that are caused by the inertia force of the propeller 24.

In the present preferred embodiment, the plurality of elastic portions 53B are integral with the base portion 53A in the damper 53, and therefore an operator is able to easily interpose each of the elastic portions 53B between the first claw 51C and the second claw 52C by fitting the base portion 53A into the space 54 surrounded by the plurality of first claws 51C and the second claws 52C. Additionally, the operator is able to easily remove each of the elastic portions 53B from between the first claw 51C and the second claw 52C by detaching the base portion 53A from the space 54. Thus, it is also possible to improve the maintainability of the coupling 50 while restraining a shift shock and a rattling noise caused by the dog clutch 27.

In the present preferred embodiment, most of each of the elastic portions 53B is compressed between the first inward portion 51CA of the first claw 51C and the second inward portion 52CA of the second claw 52C, and is elastically deformed when shifted in. This makes it possible to effectively absorb a shift shock caused when the dog clutch 27 engages with the rotary body 26. Additionally, a change in the rotation speed of the engine 13 is effectively reduced by the elastic deformation of each of the elastic portions 53B, and therefore it is possible to effectively restrain a rattling noise caused by allowing both the dog clutch 27 and the rotary body 26 to repeatedly make contact and separation therebetween resulting from a change in the rotation speed of the engine 13.

Additionally, when the elastic portion 53B is further elastically deformed because of an increase in torque of the engine 13, the first outward portion 51CB of the first claw 51C and the second outward portion 52CB of the second claw 52C come into contact with each other. This enables the coupling 50 to transmit an increased high torque between the first shaft 141 and the second shaft 142. Therefore, it is possible to adjust the maximum value of torque to which the elastic portion 53B is adaptable so that the elastic portion 53B does not generate heat because of elastic deformation caused by the high torque, and therefore it is possible to restrain the deterioration of the elastic portion 53B resulting from heat generation and to improve the durability of the elastic portion 53B. Additionally, it is possible to make the elastic portion 53B in a proper size in accordance with that maximum value, and therefore it is possible to downsize the damper 53. Additionally, it is possible to continue torque transmission between the first shaft 141 and the second shaft 142 because of contact between the first outward portion 51CB and the second outward portion 52CB even if the elastic portion 53B is broken.

In the present preferred embodiment, as a first arrangement of the coupling 50, the outer end portion in the radial direction R of the first inward portion 51CA is connected to the center of the first outward portion 51CB in the rotation direction S. The outer end portion in the radial direction R of the second inward portion 52CA is connected to the center of the second outward portion 52CB in the rotation direction S.

If the rotation direction S of the drive shaft 14 includes a first rotation direction S1 and a second rotation direction S2 (see FIG. 6), the first arrangement enables the first outward portion 51CB and the second outward portion 52CB to come into contact with each other when the torque of the engine 13 is increased even if the drive shaft 14 rotates in either direction. This enables the coupling 50 to transmit a high torque between the first shaft 141 and the second shaft 142 even if the drive shaft 14 rotates either in the first rotation direction S1 or in the second rotation direction S2.

Figure 8:
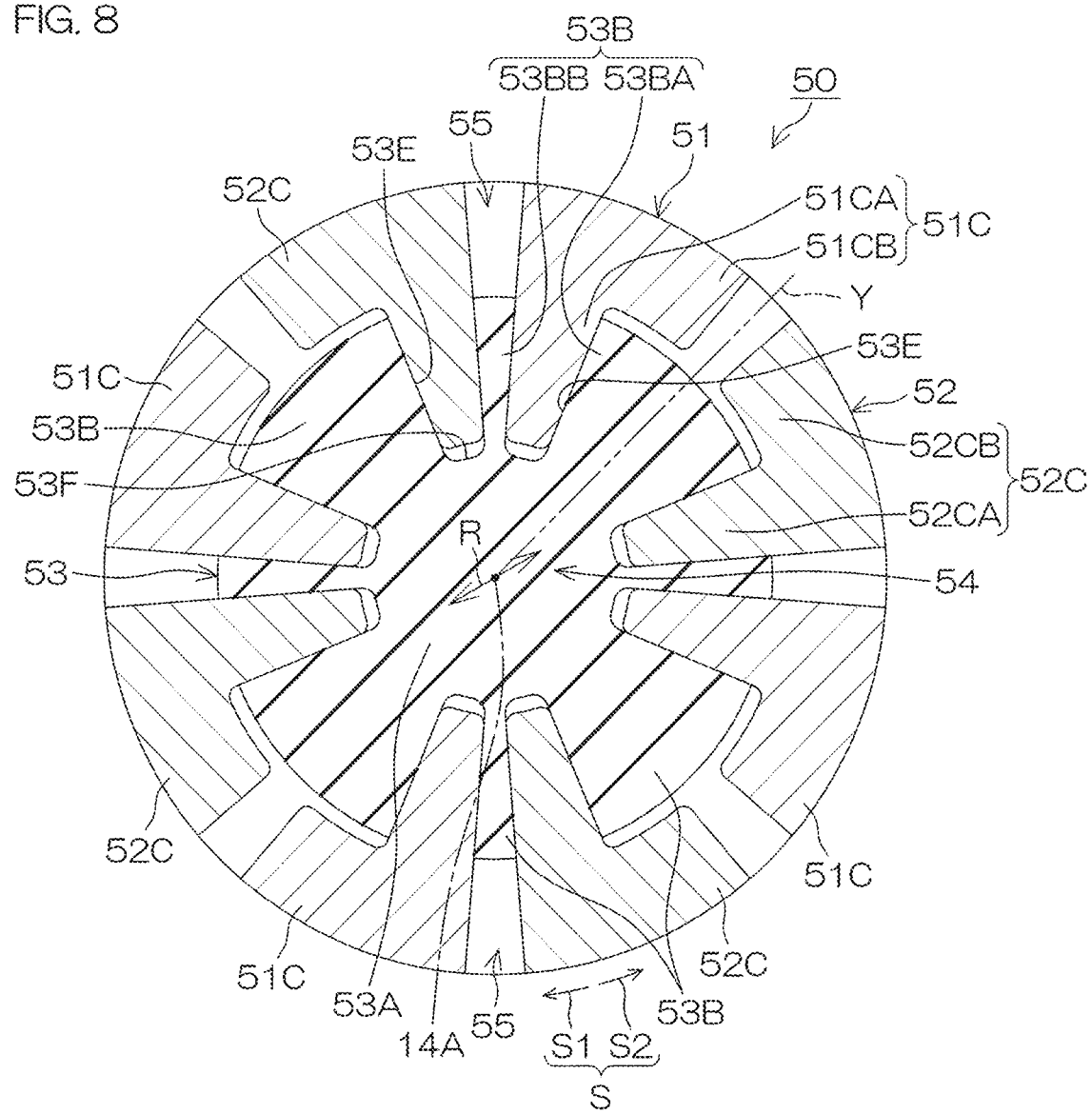
FIG. 8 is a plan cross-sectional view of the coupling according to a first modified preferred embodiment of the present invention.

If the drive shaft 14 rotates in only one direction, i.e., either in the first rotation direction S1 or in the second rotation direction S2, the outer end portion in the radial direction R of the first inward portion 51CA of the first claw 51C may be connected to the end portion of the first outward portion 51CB in the rotation direction S as in the first modified preferred embodiment (second arrangement of the coupling 50) shown in FIG. 8. Likewise, the outer end portion in the radial direction R of the second inward portion 52CA of the second claw 52C may be connected to the end portion of the second outward portion 52CB in the rotation direction S. In that case, each of the first and second claws 51C and 52C has the shape of the letter L when seen from the axial direction of the drive shaft 14. Additionally, when seen from the axial direction of the drive shaft 14, the first claw 51C and the second claw 52C adjacent to each other in the rotation direction S are arranged so as to be symmetrical with each other based on a phantom line Y that passes through a space between these claws and through the rotational axis 14A of the drive shaft 14. More specifically, if the drive shaft 14 rotates only in the first rotation direction S1, the outer end portion in the radial direction R of the first inward portion 51CA is connected to the end portion of the first outward portion 51CB in the second rotation direction S2. On the other hand, the outer end portion in the radial direction R of the second inward portion 52CA is connected to the end portion of the second outward portion 52CB in the first rotation direction S1. If the drive shaft 14 rotates only in the second rotation direction S2 unlike that of FIG. 8, the first claw 51C and the second claw 52C are arranged so as to be mutually opposite in the relationship therebetween.

In FIG. 8, the elastic portion 53B includes a first elastic portion 53BA comparatively large in the rotation direction S and a second elastic portion 53BB smaller than the first elastic portion 53BA in the rotation direction S, and the first elastic portion 53BA and the second elastic portion 53BB are alternately arranged in the rotation direction S. Each groove 53E is located between the first elastic portion 53BA and the second elastic portion 53BB adjacent to each other in the rotation direction S. Each of the first and second elastic portions 53BA and 53BB is interposed between the first inward portion 51CA of the first claw 51C and the second inward portion 52CA of the second claw 52C that are adjacent to each other in the rotation direction S. The first outward portion 51CB of the first claw 51C and the second outward portion 52CB of the second claw 52C face the first elastic portion 53BA from the outward side in the radial direction R, and yet do not face the second elastic portion 53BB. FIG. 8 shows a state in which the shift position of the outboard motor 1 is neutral.

In this case, when the first portion 51 moves relatively with respect to the second portion 52 in the first rotation direction S1 so as to be clockwise in a plan view as described above, the first elastic portion 53BA is mainly compressed by the first and second inward portions 51CA and 52CA in each of the elastic portions 53B. If the second arrangement of FIG. 8 is used as thus described, the first inward portion 51CA and the second inward portion 52CA are disposed so as to be separated from each other to a maximum extent. Thus, in the second arrangement, it is possible to increase the volume of a portion of the elastic portion 53B that is compressed between the first inward portion 51CA and the second inward portion 52CA, even if the damper 53 is the same in size in comparison with the first arrangement described above (see FIG. 3 to FIG. 7), and therefore it is also possible to withstand a great shift shock. This makes it possible to more effectively restrain a shift shock and a rattling noise caused by the dog clutch 27.

In the first claw 51C, the outer end portion in the radial direction R of the first inward portion 51CA may be connected to a portion between the center and the end portion of the first outward portion 51CB in the rotation direction S as an arrangement between the first arrangement and the second arrangement. The same applies to the second claw 52C.

In the present preferred embodiment, the angular range α of the elastic portion 53B in the rotation direction S is equal to or less than the angular interval β between the first and second inward portions 51CA and 52CA adjacent to each other in the rotation direction S. The angular range α is equal to or more than the angular interval γ between the first and second outward portions 51CB and 52CB adjacent to each other in the rotation direction S.

With this structural arrangement, the elastic portion 53B is interposed between the first inward portion 51CA and the second inward portion 52CA that are adjacent to each other in the rotation direction S, and is located at a more inward position in the radial direction R than the first and second outward portions 51CB and 52CB adjacent to each other in the rotation direction S. This makes it possible to position the elastic portion 53B both in the rotation direction S and in the radial direction R. Additionally, the elastic portion 53B does not exist between the first and second outward portions 51CB and 52CB that are adjacent to each other, and therefore the first and second outward portions 51CB and 52CB are able to come into contact with each other when the torque of the engine 13 is increased.

The second shaft 142 of the drive shaft 14 may be divided into a third shaft 143 to which the second portion 52 of the coupling 50 is attached and a fourth shaft 144 that is located at a lower position than the third shaft 143 and that is connected to the driving gear 25 of the transmission mechanism 16 (see FIG. 1). A lower end portion of the third shaft 143 and an upper end portion of the fourth shaft 144 are spline-coupled to each other. At least the propeller 24, the propeller shaft 15, the transmission mechanism 16, and the fourth shaft 144 define a lower assembly 60 in the outboard motor body 5.

Figure 9:
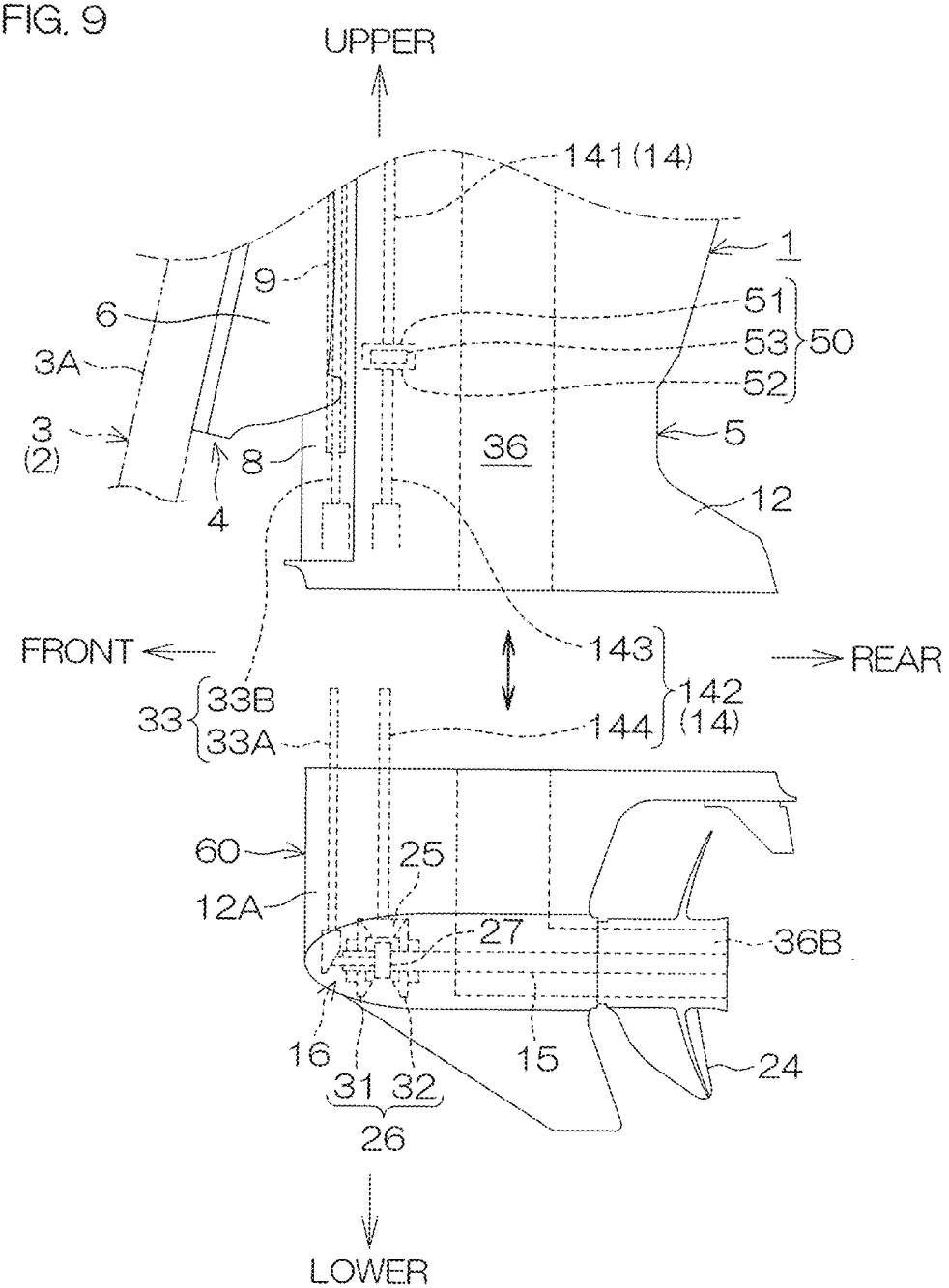
FIG. 9 is a schematic side view of a lower portion of the outboard motor in a state in which a lower assembly has disengaged.

The lower assembly 60 also includes the lower case 12A. Additionally, the shift rod 33 may be divided into a lower rod 33A connected to the dog clutch 27 and an upper rod 33B that is coaxially disposed at a higher position than the lower rod 33A, and, in that case, the lower assembly 60 also includes the lower rod 33A (see FIG. 1). The lower assembly 60 is detachable from the outboard motor body 5 as shown in FIG. 9.

With this structural arrangement, when a plurality of kinds of outboard motors 1 exist in accordance with different size transoms 3A of the vessel 2, the same kinds of lower assemblies 60 are applicable to the plurality of kinds of outboard motors 1, respectively, if a plurality of kinds of third shafts 143 that differ in size from each other are prepared. This makes it possible to reduce the number of kinds of lower assemblies 60, thus enabling a manager of, for example, a manufacturer of the outboard motor 1 to easily manage a stock of the lower assemblies 60.

Although preferred embodiments of the present invention have been described above, the present invention is not restricted to the contents of these preferred embodiments and various modifications are possible within the scope of the present invention.

For example, the arrangement of the coupling 50 can be arbitrarily changed. If only the restraint of a rattling noise is prioritized, the damper 53 may be further downsized by making each of the elastic portions 53B smaller in at least either one of the rotation direction S and the radial direction R.

Figure 10:
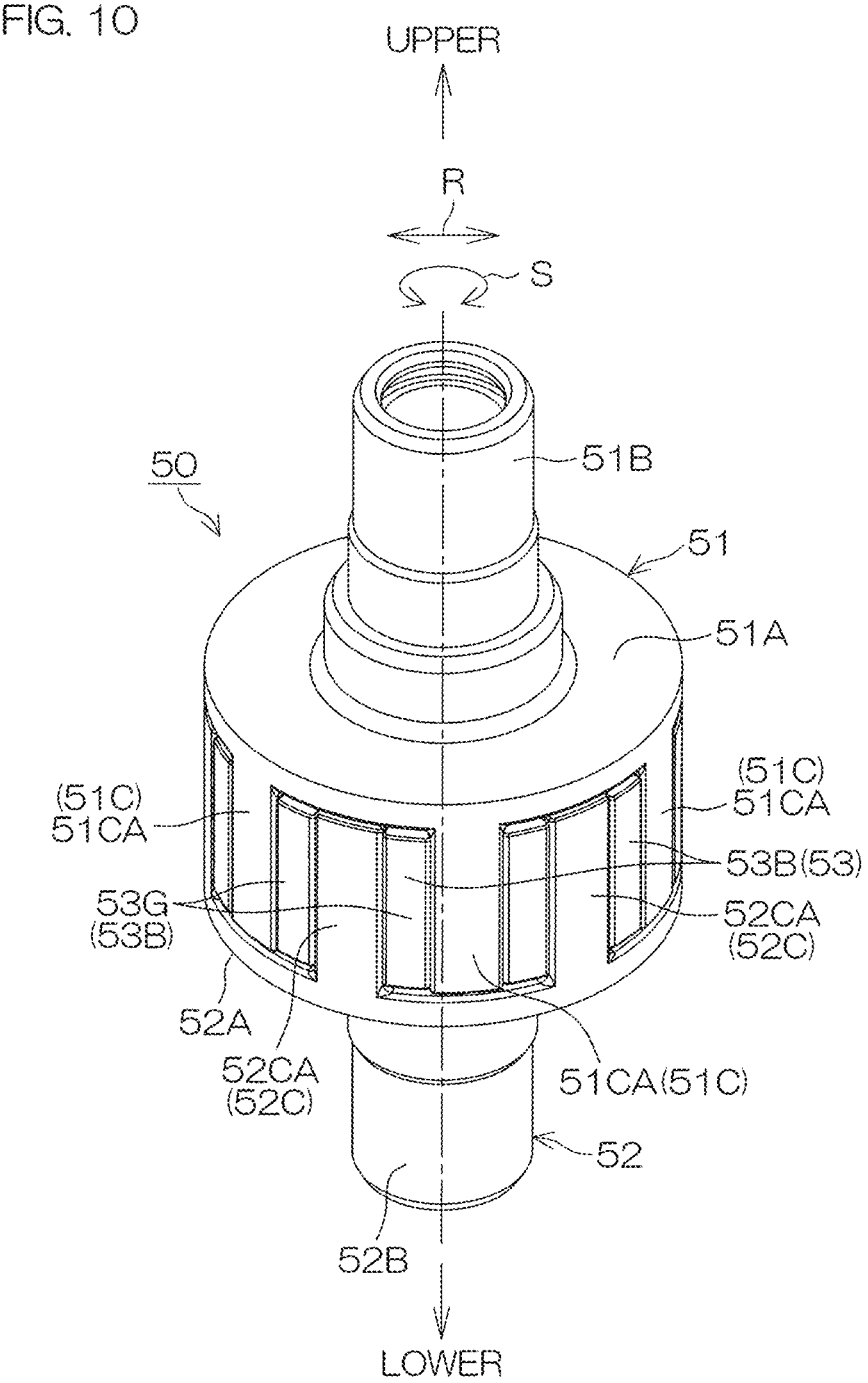
FIG. 10 is a perspective view of the coupling according to a second modified preferred embodiment of the present invention.
Figure 11:
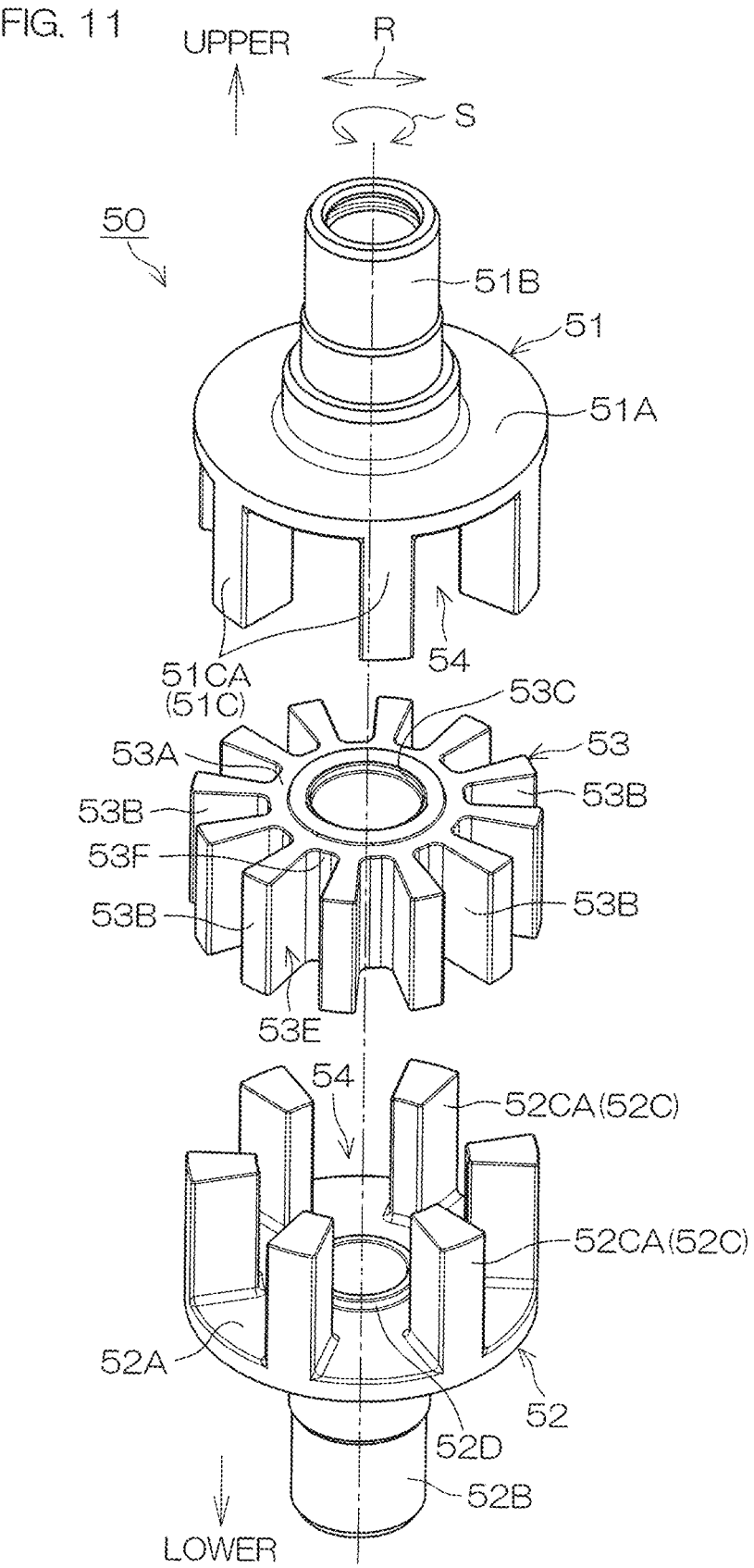
FIG. 11 is an exploded perspective view of the coupling according to the second modified preferred embodiment.
Figure 12:
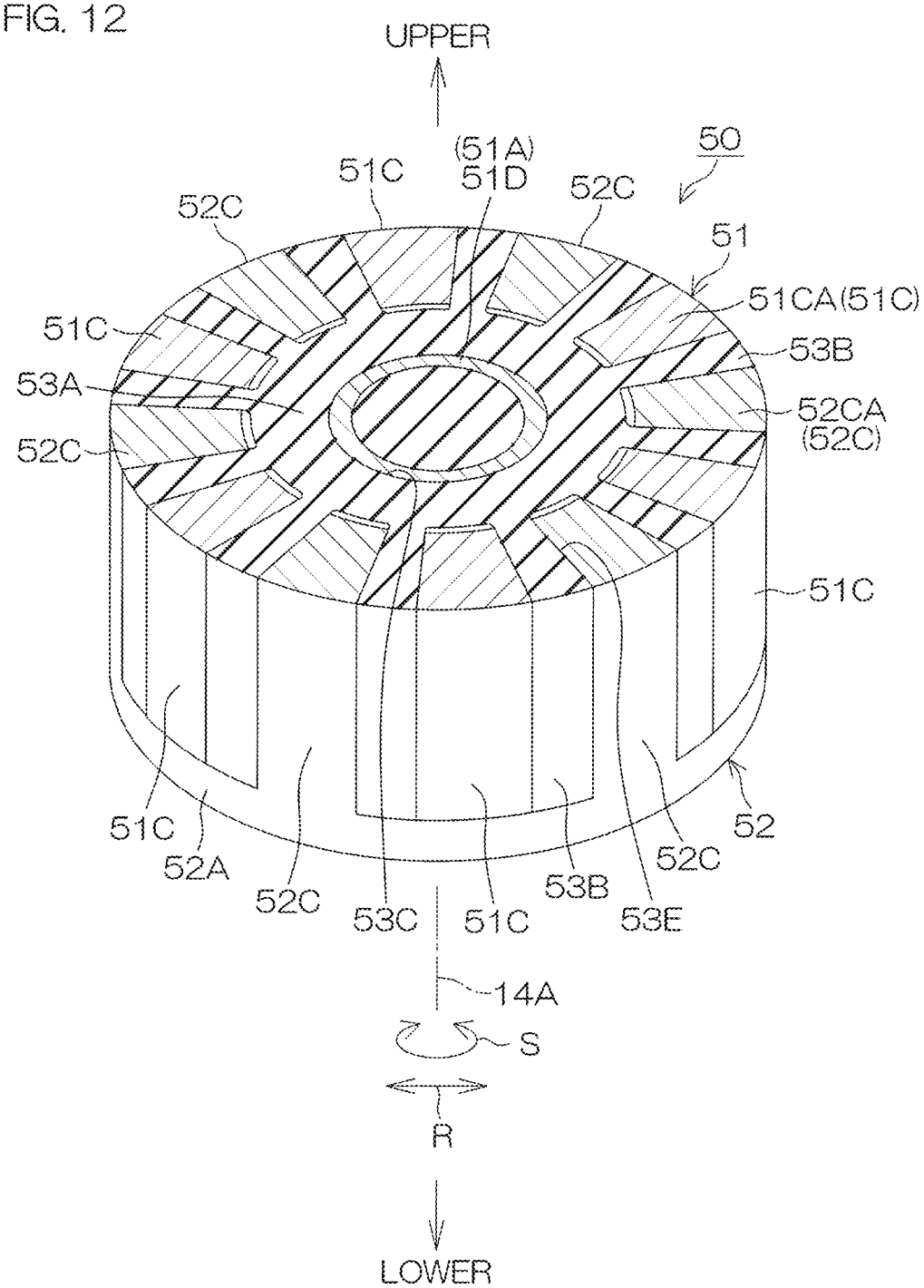
FIG. 12 is a perspective view of the coupling according to the second modified preferred embodiment, a portion of which is depicted as a cross section.

FIG. 10 is a perspective view of a coupling 50 according to a second modified preferred embodiment. FIG. 11 is an exploded perspective view of the coupling 50 according to the second modified preferred embodiment. FIG. 12 is a partial perspective view of the coupling 50 according to the second modified preferred embodiment, a portion of which is depicted by a plane cross section. With respect to the coupling 50 (third arrangement) according to the second modified preferred embodiment, the same reference numeral is given to a component that is functionally equivalent to each component already described, and a detailed description of this component is omitted (the same applies to components of other modified preferred embodiments).

The first outward portion 51CB may be omitted in the first claw 51C, and the second outward portion 52CB may be omitted in the second claw 52C in the same way as in the coupling 50 according to the second modified preferred embodiment. In this case, an outer end surface 53G in the radial direction R of each of the elastic portions 53B of the damper 53 is exposed outwardly in the radial direction R from between the first inward portion 51CA of the first claw 51C and the second inward portion 52CA of the second claw 52C (see FIG. 10). The end surface 53G is flush with the outer end surface in the radial direction R of each of the first and second inward portions 51CA and 52CA, and extends along the rotation direction S.

In the coupling 50 according to the second modified preferred embodiment, the elastic portion 53B is always interposed between the first claw 51C and the second claw 52C (see FIG. 12), and therefore it is possible to absorb a shift shock over the total range of torque generated by the engine 13 and to absorb another greater shock.

Additionally, the rigidity, i.e., the elastic modulus of at least each of the elastic portions 53B in the damper 53 may be changed in accordance with the target of the performance of shift-shock absorption or the target of the performance of rattling-noise restraint.

Additionally, the dog clutch 27 may be located on the fourth shaft 144, for example, in the second shaft 142 of the drive shaft 14 although the dog clutch 27 is located on the propeller shaft 15 in the above-described preferred embodiments (see FIG. 1). In this case, for example, the rotary body 26 is located at the lower end portion of the third shaft 143, and the dog clutch 27 is arranged so as to be attachable/detachable to/from the rotary body 26 by sliding the upper end portion of the fourth shaft 144.

Also, features of two or more of the various preferred embodiments described above may be combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
    an engine;
    a propeller shaft that is rotatable together with a propeller;
    a drive shaft divided into a first shaft and a second shaft that is farther away from the engine than the first shaft and that is rotated by power of the engine;
    a coupling to connect the first shaft and the second shaft together; and
    a transmission to transmit rotation of the drive shaft to the propeller shaft, the transmission including:
        a rotary body that is rotatable interlockingly with rotation of the second shaft; and
        a dog clutch that is rotatable interlockingly with the propeller shaft and movable between a connection position to engage with the rotary body and a disconnection position to disengage from the rotary body; wherein
    the coupling includes:
        a first portion attached to the first shaft and including a plurality of first claws arranged along a rotation direction of the drive shaft;
        a second portion attached to the second shaft and including a plurality of second claws arranged between adjacent ones of the plurality of first claws in the rotation direction; and
        a damper including an elastic portion interposed between a first claw of the plurality of first claws and a second claw of the plurality of second claws that is adjacent to the first claw in the rotation direction;
    the damper includes a plurality of the elastic portions arranged along the rotation direction;
    the plurality of elastic portions are interposed between adjacent ones of the plurality of first claws and the plurality of second claws in the rotation direction;
    the first claw includes a first inward portion and a first outward portion, the first inward portion is located between adjacent ones of the plurality of elastic portions in the rotation direction, and the first outward portion extends in the rotation direction from an outer end portion of the first inward portion and faces inward toward the elastic portion in a radial direction of the drive shaft;
    the second claw includes a second inward portion and a second outward portion, the second inward portion is located between adjacent ones of the elastic portions in the rotation direction, and the second outward portion extends in the rotation direction from an outer end portion of the second inward portion and faces inward toward the elastic portion in the radial direction;

the first inward portion and the second inward portion are alternately arranged along the rotation direction; and the first outward portion and the second outward portion are alternately arranged along the rotation direction.

2. The outboard motor according to claim 1, wherein the damper includes a base portion, and the plurality of elastic portions are integral with the base portion, extend along the radial direction of the drive shaft, and arranged radially around the drive shaft.

3. The outboard motor according to claim 1, wherein the outer end portion of the first inward portion is connected to a center or an end portion of the first outward portion in the rotation direction; and the outer end portion of the second inward portion is connected to a center or an end portion of the second outward portion in the rotation direction.

4. The outboard motor according to claim 1, wherein an angular range of the elastic portion in the rotation direction is equal to or less than an angular interval between adjacent ones of the first inward portion and the second inward portion in the rotation direction, and is equal to or more than an angular interval between adjacent ones of the first outward portion and the second outward portion in the rotation direction.

5. The outboard motor according to claim 1, wherein the propeller shaft is located at a lower position than the engine;

the drive shaft extends in an up-down direction between the propeller shaft and the engine;

the second shaft is located at a lower position than the first shaft;

the second shaft is divided into a third shaft to which the second portion is attached and a fourth shaft that is located at a lower position than the third shaft and that is connected to the transmission; and at least the propeller, the propeller shaft, the transmission, and the fourth shaft define a lower assembly in the outboard motor.

6. The outboard motor according to claim 1, further comprising a propeller damper interposed between the propeller and the propeller shaft.

7. The outboard motor according to claim 1, wherein the rotary body includes a first rotary body and a second rotary body arranged side by side in an axial direction of the propeller shaft and that rotate in mutually opposite directions around a rotational axis of the propeller shaft;

the dog clutch is movable along the axial direction; and the connection position includes a first connection position at which the dog clutch engages with only the first rotary body and a second connection position at which the dog clutch engages with only the second rotary body.

* * * * *